Dec. 1, 1931.   J. LEDWINKA   1,834,525
AUTOMOBILE BODY
Filed Aug. 16, 1927   3 Sheets-Sheet 1

INVENTOR.
Joseph Ledwinka
BY
ATTORNEY.

Dec. 1, 1931.  J. LEDWINKA  1,834,525
AUTOMOBILE BODY
Filed Aug. 16, 1927  3 Sheets-Sheet 2
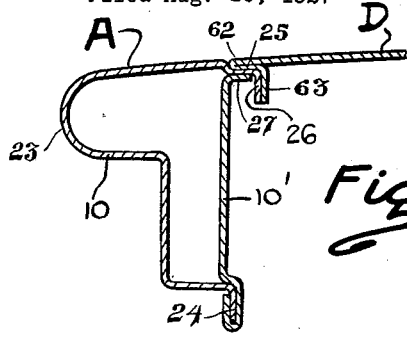
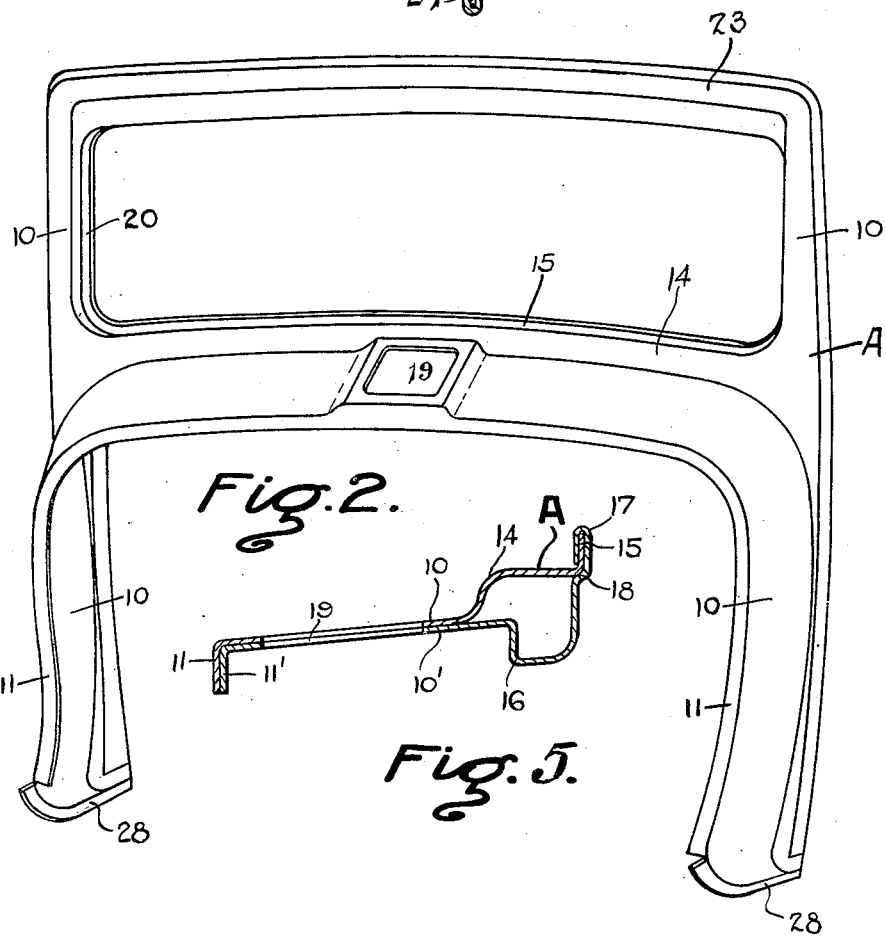
INVENTOR.
Joseph Ledwinka
BY
ATTORNEY.

Dec. 1, 1931.  J. LEDWINKA  1,834,525

AUTOMOBILE BODY

Filed Aug. 16, 1927  3 Sheets-Sheet 3

INVENTOR.
Joseph Ledwinka
BY
ATTORNEY.

Patented Dec. 1, 1931

1,834,525

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

AUTOMOBILE BODY

Application filed August 16, 1927. Serial No. 213,260.

The invention relates to pressed metal vehicle bodies and particularly to such bodies the walls of which are built up in large part of unitary inner and outer panel stampings such as are disclosed, for example, in my prior application Serial No. 159,827 filed January 8, 1927, for pressed metal vehicle bodies.

It is an object of my invention to generally improve the superstructure unit or body proper of such bodies and to adapt it to be more readily manufactured in self-sustaining, rigid sub-assemblies, which can be handled and shipped as units without danger of damage and which can readily be joined in final assembly to form a complete unitary body superstructure which can also be handled and shipped as a unit, and can be readily upholstered and painted prior to the assembly with the underframe or chassis. This underframe or chassis may, as in the prior construction above referred to, embody all the cross braces for the lower portion of the body, and which ordinarily serve as floor and seat supports.

It is also an object of my invention to still further lighten the body superstructure by reducing the extent of the inner bracing and reinforcing paneling and to further reduce the cost of manufacture by forming certain parts in one die-stamping operation which heretofore required several operations, thus reducing both the die cost and labor costs of manufacture.

These objects are attained further by making the front section of the body superstructure a unitary sub-assembly comprised of inner and outer stampings which may be each formed from one piece of flat stock or in several pieces welded together either after they have been partially or wholly given their desired form. I prefer, however, to form each of these inner and outer stampings of such an extent, and at one die stamping operation, as to form portions of the cowl, A-posts, and upper and lower windshield headers, and to join these stampings along their edges to form in effect a substantially continuous closed hollow structure, which is extremely strong and stiff, while yet of a minimum weight.

In the attainment of these objects I further make the side portions of the body superstructure as independent sub-assembly units extending from the A-post to and around the rear quarter, and so join the outer and inner panels forming this unit at the A-posts and so join it with the front unit in final assembly as to greatly strengthen the A-post structure by combining in it a closed hollow section with a channel section. I simplify the top headers above the sides of the window openings and thus reduce the extent of the inner stamping not along its edge but just above the door opening. I also reduce the extent of the inner panel at the rear by having it end at a point just in rear of the rear quarter window opening. The inner paneling is still further reduced in weight and rendered of open construction by forming it with generous openings, which permit access to the outer panel, for straightening in case of damage and also to permit the ready application or removal of the interior trim or upholstery.

Additional objects and advantages and the manner in which they are attained will become apparent from the following detailed description, when read in connection with the accompanying drawings, forming a part hereof.

In the drawings:—

Fig. 2 is an outside view in perspective of the unitary outer shell forming the cowl, and portions of the front or A-posts and the upper and lower windshield headers.

Figs. 4 and 5 are sections taken respectively through the upper and lower windshield headers of the front unitary sub-assembly formed by joining the parts shown in Figs. 2 and 3.

In the embodiment of my invention selected for illustration, the body superstructure is comprised of five main unitary sub-assemblies which are rigid and self-supporting in and of themselves and capable of being handled and shipped as units.

The unitary sub-assemblies comprise a front sub-assembly A, two side sub-assemblies B, a rear sub-assembly C and a top sub-assembly D partly shown in Fig. 4. These various sub-assemblies are marginally joined together in the final assembly in a manner to be presently described to form the complete, unitary, self-sustaining, body superstructure.

The front unitary sub-assembly A is itself built up of but two unitary parts or sub-assemblies 10 and 10′ forming outer and inner shells of light gauge sheet metal which are each of an extent to form, when assembled, the cowl and forward portions of the A-posts and the upper and lower windshield headers. I preferably form each of these sub-assemblies 10 and 10′ out of flat stock by a single die stamping operation, but I may, of course, if desirable, make them by several die stamping operations, and, if desired, each part 10 and 10′ may be made of several sheets welded together along their meeting edges and partially or wholly formed to the desired final contour, either before or after welding.

Figure 3:
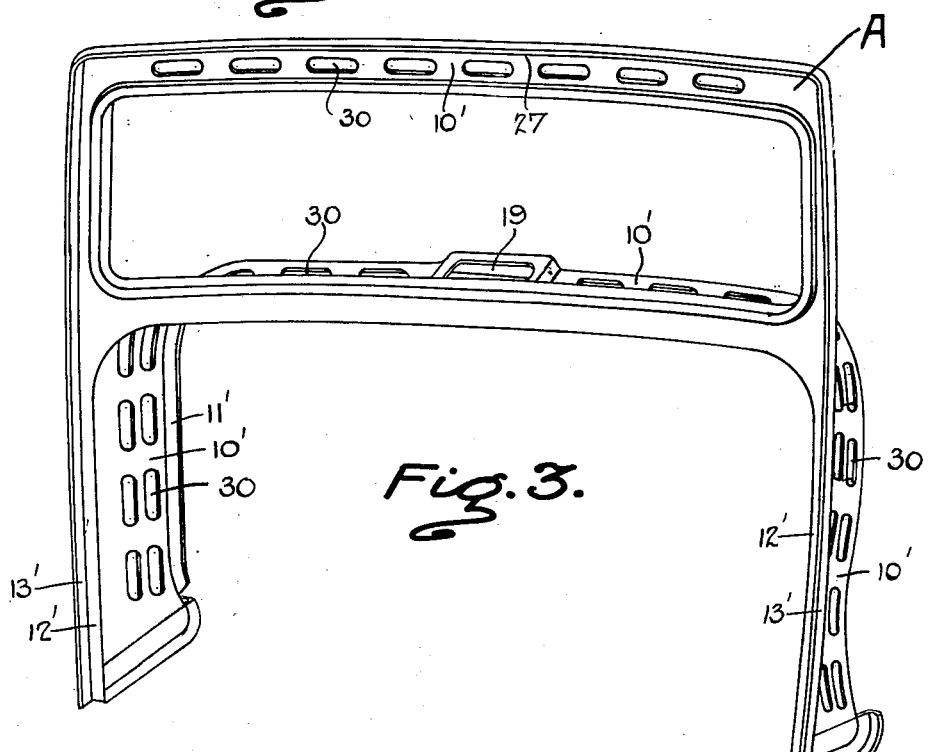
Fig. 3 is an inside view, in perspective, of the unitary inner shell forming the corresponding inner portions of the cowl, A-posts and windshield headers.

As shown in Figs. 2 and 3, and in the sectional views of Figs. 4, 5, 6 and 7, each of the parts 10 and 10′ is generally open rearwardly thereby adapting the entire part to be substantially completely formed by a single die stamping operation. This is a decided advantage, since it eliminates the more or less troublesome joints made by welding or otherwise at the corners of the windshield frame and insures accuracy of dimensions at the windshield opening and accuracy of alignment and fit with the adjoining unitary sub-assemblies and throughout in the joinder of the parts 10 and 10′ themselves.

Figure 7:
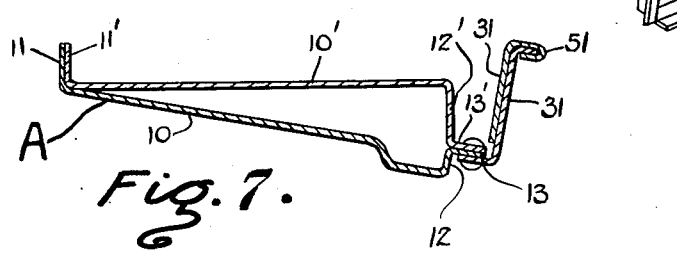

The front, the top and sides of the cowl portion of the parts 10 and 10′ are flanged inwardly as indicated at 11 and 11′ and secured together as by welding, thus forming a reinforced edge at the front of the cowl. At the sides of the cowl, as shown in Fig. 7, the outer and inner parts 10 and 10′ are spaced a substantial distance at their rear ends, the outer part 10 being flanged inwardly at 12 and the inner part 10′ being flanged outwardly in the same transverse plane at 12′, these flanges 12 and 12′ being then flanged rearwardly, respectively, at 13, 13′ and joined together by welding or otherwise securing the flanges 13, 13′ together. Thus a hollow closed structure is produced at the sides of the cowl combining the functions of the cowl and front or A-post structures.

At the top of the cowl the outer and inner parts 10 and 10′ are, as shown in Fig. 5, in contacting relation through the greater portion of the depth of the cowl, but at the rear the outer part 10 is offset upwardly at 14 and provided along its rear edge with an upwardly extending flange 15. The inner part 10′ is offset downwardly at the rear as at 16 and then flanged upwardly at 17, an offset portion of said flange forming a shoulder 18 upon which the outer part 10 rests, the edge of the flange 17 being crimped over the flange 15. Thus a closed hollow lower windshield header is formed along the rear edge of the cowl. As shown in Figs. 2 and 5, a ventilator opening 19 is provided, as usual, in the top of the cowl.

Figure 6:
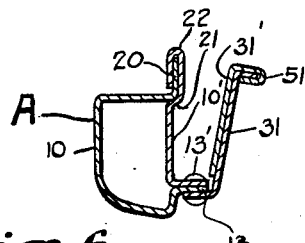
Figs. 6 and 7 are detail sections taken, respectively, on the correspondingly numbered section lines as indicated in Fig. 1.

The parts 10 and 10′ extend upwardly above the cowl to form the A-post structures which provide the side portions of the windshield frame and the top windshield header connecting said side portions. As shown in Fig. 6, the outer part 10 above the belt line is of rearwardly presenting channel form of a depth substantially equal to the thickness of the frame surrounding the windshield opening and is flanged inwardly at 20 in the same plane as the flange 15 at the bottom of the windshield opening. The inner part 10′ is here provided with an offset forming a shoulder 21 similar to the shoulder 18 at the bottom of the windshield opening and the edge 22 thereof is crimped over the flange 20 to form a joint similar to the joint at the bottom of the windshield opening. Along their outer edges the flanges 13, 13′ are extended upwardly to the top of the body and the joinder of these flanges above the belt line is the same as below the belt line.

At the top the outer part 10 is again of generally rearwardly presenting channel form, the upper portion of the channel being deepened at 23 to form the rounded forwardly projecting peak and the upper side wall forming the front portion of the roof. The lower side wall of the channel is flanged downwardly at 24 in the same plane as the flanges 15 and 20 and the inner part 10′ is secured to this flange by crimping in the same manner as at the sides and bottom of the windshield opening. At the rear edge the top side wall of the outer part 10 is offset downwardly at 25 and provided with a downwardly extending edge flange 26. The inner part 10′ is here flanged rearwardly at 27 and secured by spot welding to this offset portion. At the bottom of the side portions of the cowl the outer part 10 before assembly with the part 10′ has a downwardly extending flange 28 (Fig. 2) and the inner part 10′ is shouldered and provided with a flange 29 which, in final assembly, is crimped over the edge of the flange 28 to provide a locked clinched joint similar to the joints around the margins of the windshield opening.

Thus is produced a front section embodying cowl, A-post structures, and upper and lower windshield headers which is comprised of only two unitary sections or stampings 10 and 10' which are joined together around the windshield opening and substantially through their outer margins so as to form a continuous intercommunicating closed hollow structure which is very light, yet extremely rigid and strong and durable, and hence capable of being handled and shipped as a unit and of withstanding all the shocks and strains of usage. Lightness, and accessibility to the space between the inner and outer parts is still further attained, as shown, without material sacrifice of strength, by forming the inner part 10' with openings 30. These openings also permit the easy application and removal of the inner trim and/or upholstery.

The side-sub-assemblies B of the improved body superstructure comprise, as in the earlier application above referred to, the outer and inner light gauge sheet metal unitary sub-assemblies which may be and preferably are each formed at one die stamping operation, the outer part 31 forming, as in the structure disclosed in the prior application, parts of the post structures, the thresholds and the top headers, as well as side portions of the roof, and the rear quarter including the rear corner of the body. This part is substantially similar to the corresponding part in the prior application above referred to, being a relatively deep drawing and formed with transverse flanges around door and window openings of substantially the full depth of said openings.

Figure 1:
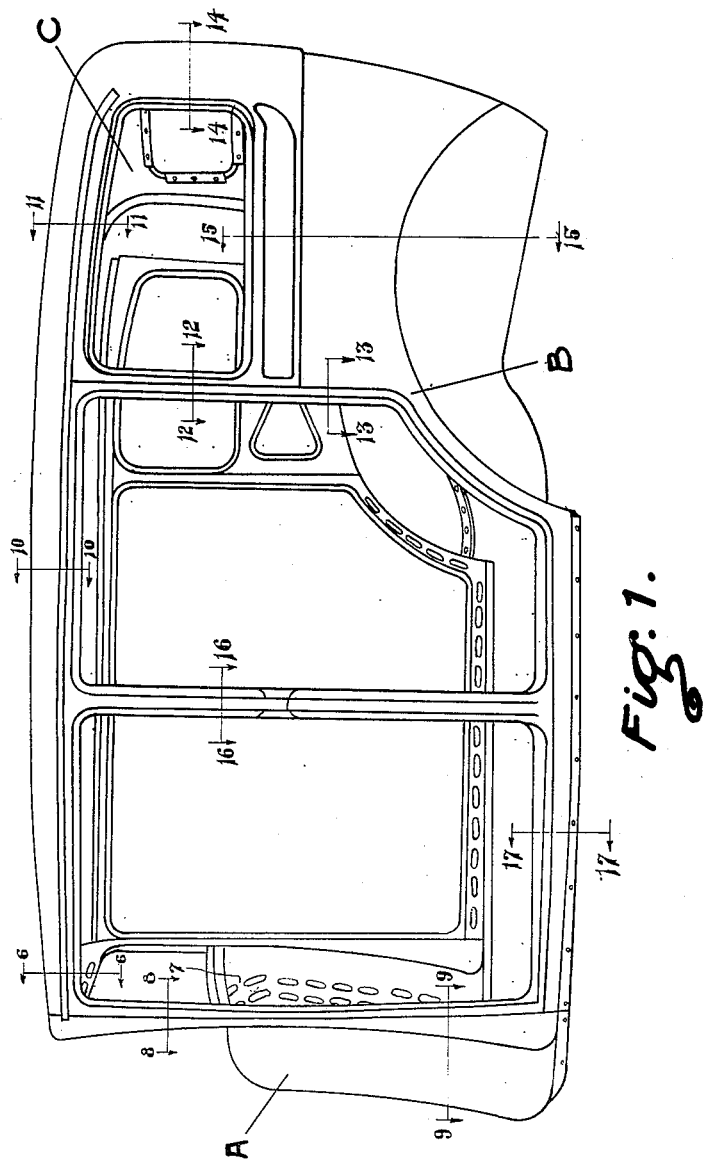
Fig. 1 is a perspective view of the complete unitary body superstructure ready to be mounted upon the underframe or chassis.

The inner part 31' forms with the outer part 31 the complete side assembly B, Figure 1. The detail construction of this part except as it enters into the A-post construction, where the side sub-assembly is joined to the front sub-assembly, is not a part of the invention to be covered by this application.

At the A-post the outer part 31 is substantially Z-shape in cross section the web of the Z extending substantially at right angles to the plane of the door opening, while the inner part 31' is of angle shape, this angle nesting with the angle formed by the web and the inner arm of the Z and having its arm adjacent the inner arm of the Z crimped thereover at 51 as shown in Figs. 6 and 7.

In the final assembly the front sub-assembly A and the side sub-assemblies B are brought together with the welded together flanges 13, 13' of the front sub-assembly overlapping the outer forwardly directed arm of the Z section A-post portion of the side sub-assemblies B and these three flanges are united by riveting or otherwise. In this way the side units form with the front unit an A-post structure of combined box and channel section, as clearly appears in Figs. 6 and 7 which show the A-post structure in section both above and below the belt line. This makes a very strong post structure and adapts it readily for the attachment of interior parts and/or trim.

The body of this invention is, like that of the earlier application hereinbefore referred to, characterized by a roominess and a beauty of line and contour not attainable with the former constructions or only with great difficulty and at large cost. With a body constructed in the manner in which the present body has been constructed, as hereinbefore described, these desirable characteristics are attained with a less material, a smaller die cost, and smaller amount of labor in forming and assembling and upholstery and trimming, all of which factors tend to greatly reduce the cost of manufacture, and to enable the manufacturer to pass on this advantage to the consumer.

While I have herein described a specific embodiment of my invention, I am aware that changes and modifications may be made without departing from the spirit and scope of the invention, and the claims appended hereto are indicated to include in their scope all such changes and modifications.

What I claim and desire to secure by Letters Patent is:

1. A front unitary sub-assembly for pressed metal vehicle bodies comprising unitary inner and outer sheet metal stampings forming A-post structures, a cowl merging into said A-post structures and extending forwardly therefrom and a lower windshield header, said stampings being substantially coextensive, spaced in their bodies and joined together in their margins.

2. A front unitary sub-assembly for pressed metal vehicle bodies comprising inner and outer sheet metal stampings together forming a hollow combined cowl and A-post structure including the sides and top of the cowl and vertical A-post portions merging into the cowl and rising thereabove, said stampings being spaced in their bodies and joined in their margins to form a hollow reinforced structure.

3. A front unitary sub-assembly for pressed metal vehicle bodies comprising inner and outer stampings forming the sides and top of the cowl and joined together in their front and rear margins to form a reinforced cowl structure.

4. A front unitary sub-assembly for pressed metal vehicle bodies comprising inner and outer stampings joined in their forward and rear margins and forming a hollow reinforced combined cowl, A-post and lower windshield header structure.

5. A front unitary sub-assembly for pressed metal vehicle bodies comprising inner and outer stampings spaced in their bodies and joined in their forward and rear margins and in the margins of the windshield opening and forming a hollow reinforced combined cowl, A-post, and upper and lower windshield header structure.

6. A front unitary sub-assembly for pressed metal vehicle bodies comprising inner and outer stampings extending around the windshield opening, spaced in their bodies and joined in the margin of the windshield opening and in their outer margins to form A-post structures and upper and lower windshield headers.

7. In a pressed metal vehicle body wall construction having inner and outer panels together forming the paneling and framing of the body wall a unitary sheet metal stamping shaped and extended vertically and horizontally to form, when assembled in the body, the inner faces of the cowl, of the A-post structures and of the upper and lower windshield headers respectively.

8. A vehicle body construction comprising an endmost unitary sub-assembly including a hollow post structure formed of inner and outer stampings formed to provide a door overlap portion, an adjoining unitary sub-assembly comprising the jamb face portion of the post and having a portion overlapping the door overlap portion of the endmost unit and joined thereto in final assembly.

9. A sheet metal vehicle body construction comprising separate unitary front and side sub-assemblies, each of said sub-assemblies comprising closed hollow structures formed by outer and inner panels joined along their mating edges, and joined in final assembly in the plane of the A-posts.

In testimony whereof I hereunto affix my signature.

JOSEPH LEDWINKA.